United States Patent [19]
Cook et al.

[11] Patent Number: 5,418,444
[45] Date of Patent: May 23, 1995

[54] AUTOMATIC BATTERY CHARGE AND DISCHARGE CONTROL SYSTEM

[75] Inventors: Gary L. Cook, Eagan; Bruce D. Nelson, Eden Prairie, both of Minn.

[73] Assignee: Goldeneye Products, Inc., Eden Prairie, Minn.

[21] Appl. No.: 80,324

[22] Filed: Jun. 22, 1993

[51] Int. Cl.⁶ .............................................. H02J 7/14
[52] U.S. Cl. .......................................... 320/7; 320/15
[58] Field of Search ........................... 320/6, 7, 15, 16

[56] References Cited

U.S. PATENT DOCUMENTS

| | | | |
|---|---|---|---|
| 3,258,670 | 6/1966 | Piechon | 320/6 |
| 3,457,491 | 7/1969 | Black et al. | 320/48 |
| 3,718,848 | 2/1973 | Hines | 320/7 |
| 3,763,415 | 10/1973 | Ownby | 320/7 |
| 4,004,208 | 1/1977 | Tamminen | 320/7 X |
| 4,081,738 | 3/1978 | Roller | 320/7 |
| 4,082,992 | 4/1978 | Day | 320/6 |
| 4,114,082 | 9/1978 | Scheidler | 320/7 |
| 4,264,855 | 4/1981 | Ghibaudo et al. | 320/6 |
| 4,281,277 | 7/1981 | Lakey | 320/6 |
| 4,649,332 | 3/1987 | Bell | 320/7 |
| 4,959,554 | 9/1990 | Underwood, IV et al. | 307/38 |
| 5,051,548 | 9/1991 | Underwood, IV et al. | 200/110 |
| 5,111,132 | 5/1992 | Motose | 320/15 X |
| 5,164,655 | 11/1992 | Heavey | 320/15 X |
| 5,225,761 | 7/1993 | Albright | 320/15 |
| 5,233,282 | 8/1993 | Iwashita | 320/7 |

FOREIGN PATENT DOCUMENTS 4261343 9/1992 Japan ..................... 320/15

*Primary Examiner*—Kristine L. Peckman
*Attorney, Agent, or Firm*—Merchant, Gould, Smith, Edell, Welter & Schmidt

[57] ABSTRACT

An automatic ignition controlled battery charge and discharge system for vehicles such as RV's boats and the like, that have an engine with a charging system connected to a main battery, an ignition switch controlling the engine, and a plurality of auxiliary batteries. When the engine ignition is turned on, the main battery connected to a generator or alternator of the engine is placed in parallel with a plurality of auxiliary batteries for charging, and when the engine ignition is turned off, the main battery is isolated from the plurality of auxiliary batteries, to allow the auxiliary batteries to discharge without affecting the voltage potential of the main battery. In an alternate embodiment the system has an AC-power charger that allows the main battery to be placed in parallel with a plurality of auxiliary batteries and charged by the AC-powered charger, when the ignition is turned off, and a sensing circuit that provides a means for sensing the charge potential of the main and auxiliary batteries, whereby charging of each battery is discontinued upon sensing that each battery maximum charging potential has been reached.

18 Claims, 2 Drawing Sheets

AUTOMATIC BATTERY CHARGE AND DISCHARGE CONTROL SYSTEM

BACKGROUND OF THE INVENTION

The invention relates generally to a battery charge and discharge control system for vehicles such as boats, RV's and the like, and more particularly to an ignition controlled multiple battery charge and discharge system for boats.

In recent years, there has been increased use of electrical systems as a prime source for motive power in trolling, and as a source of power for accessories. Automobile-type 12 volt electrical power systems are mainly what is used and commercially available for fishing crafts to provide the electrical power needed.

Boat users have found, in some cases, that a more efficient utilization of power is achieved at a voltage that is higher than that of the standard 12 volt system. To solve this problem, boat users began combining two or more batteries in series to obtain multiples of the 12 volts obtained from standard batteries. These practices have been furthered by manufacturers introduction and offering of 24 volt or combinations of 12 or 24 volt trolling motors. These motors are most likely to be powered by multiple 12 volt batteries.

Along with the practice of using multiple 12 volt batteries comes the problem of how to charge them. Although these batteries are connected in series during use to yield multiples of 12 volt output, they must be connected in parallel during charging. In the past, boat users have had to physically disconnect the combined series of batteries and connect them in parallel, or manually flip a switch that controls series and parallel connection.

In most cases, the boat or RV has a main battery connected to the generator or alternator of an engine. To charge the accessory 12 volt batteries, they are placed in parallel with the main battery. As mentioned above, series and parallel connections have been performed both physically and manually. The problem with these methods is that they are time consuming and leave open the possibility for human error. This would be especially true for a fisherman who needs to make the appropriate connections but has no daylight or battery power to yield the appropriate light to make the necessary connection. There is a need for an automatic control system that eliminates the need for physical and manual connection of batteries. There is a need for a system that automatically isolates the main battery from a series connection with the auxiliary batteries to allow the auxiliary batteries to discharge without affecting the voltage of the main battery.

Another problem associated with physical and manual connection of multiple 12 volt batteries is that when the batteries are not being charged and are in series, there is the possibility of draining all of the electrical power in main battery as well as in the auxiliary batteries. To overcome this problem, the main battery would need to be isolated from the auxiliary batteries, so that the auxiliary batteries can be discharged without affecting the voltage level in the main battery. Isolation insures that electrical power will be available when the engine needs to be started. In the past, the task of isolating the main battery would be performed physically, or manually by way of a control switch. Again, these methods of isolating the main battery are time consuming and leave open the possibility for human error.

A number of electronic circuits have been developed to provide manual dual battery switching systems. One such device is disclosed in U.S. Pat. No. 4,114,082 to Sheilder (issued Sep. 12, 1978). The Sheilder circuit is used on a pair of batteries of equal voltage rating and connects them together in parallel through isolation rectifiers and in series through an electronic switch.

The problem that fishermen encounter through the use of the Sheilder circuit is the error that may result from manual engagement of the circuit. In addition, the Sheilder circuit uses Silicon Control Rectifiers and diodes for isolation of the batteries, which prevents them from ever attaining full charge, due to the voltage drop across the diode. There is a need for a system that can isolate batteries during discharge, and provide full charge to those battery during charging.

Further, there is a need for a system that can provide 100% charging to batteries that are not of an equal voltage rating. Ideally, the system would allow for parallel charging of each battery up to its maximum charging potential, and upon reaching that battery's maximum charging potential, charging is discontinued. Parallel charging of the remaining batteries will be continued until each individual battery's maximum charging potential has been reached.

In particular, this feature would be helpful where boat users chose to use "deep cycle" batteries as auxiliary batteries and lead acid batteries for the main battery. A system that could provide maximum charging of all batteries having different voltage ratings would eliminate the possibility of overcharging one battery and undercharging another.

SUMMARY OF THE INVENTION

The present invention involves an electrical circuit that forms a battery charge and discharge control system for vehicles, such as RV's boats and the like, that have an engine with a charging system connected to a main battery, an ignition switch controlling the engine, and a plurality of auxiliary batteries.

It is an object of the present invention to provide an automatic battery charge and discharge control system that offers ignition control to the charging and discharging of multiple batteries. In particular, the engine ignition, when turned on places a main battery connected to the generator or alternator of the engine in parallel with a plurality of auxiliary batteries during charging, and when turned off isolates the main battery from the plurality of auxiliary batteries, allowing the auxiliary batteries to discharge without affecting the voltage potential of the main battery. Further, the present invention has a means for overriding the ignition control when the ignition is turned to an off position. The override allows the main battery to be placed in parallel with a plurality of auxiliary batteries and charged by a charging circuit, when the ignition is turned off.

It is another object of the present invention to provide a means for sensing the charge potential of the main and auxiliary batteries through the charger circuit. The charger circuit discontinues charging the main battery upon sensing the main battery maximum charging potential has been reached, and discontinues charging the auxiliary batteries upon sensing the auxiliary battery maximum charging potentials have been reached. The charger circuit means for sensing allows for each individual battery to be charge up to 100% of its charging potential, and thereby provides for optimal usage of batteries, even when they are not all of the same maximum voltage potential.

DETAILED DESCRIPTION

The present invention is an electrical circuit forming a battery charge and discharge control system manager, that allows a motor vehicle or boat user to charge all the batteries on the vehicle or boat from a main battery connected directly to the generator or alternator of the engine or from a battery charger without disconnecting any of the batteries. More importantly, this control system interlinks all batteries to the main battery of the engine, so that every time the engine is started, the batteries are automatically charged as the boat is running. When it is desired to charge the batteries through a battery charger, a manual switch allows for the circuit to be manipulated so that the batteries can be charged by the charger circuit.

The present invention is designed to give a boat user the option of operating either 12 volt, or systems that are multiples thereof.

Figure 1:
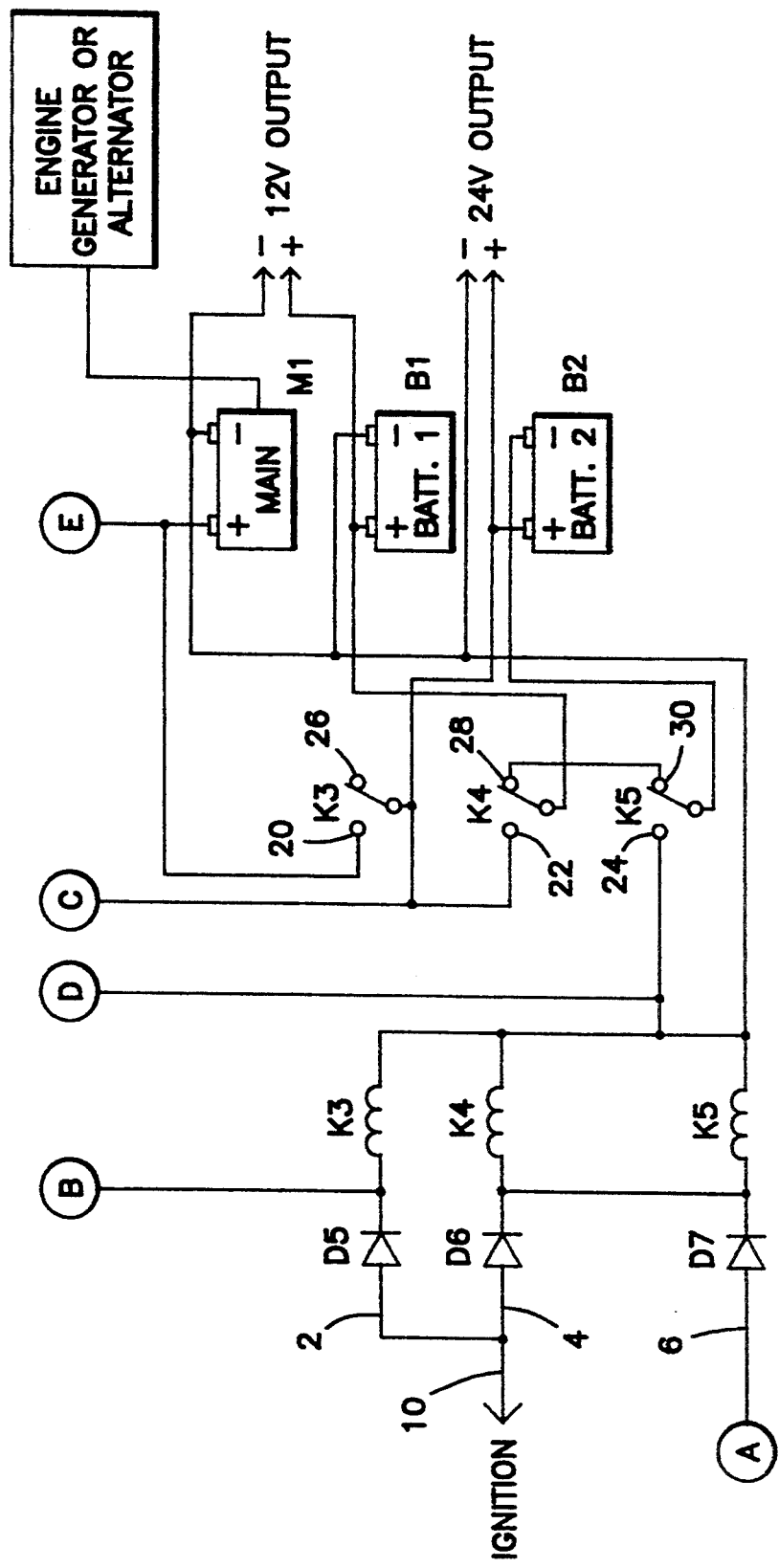
Figure 2:
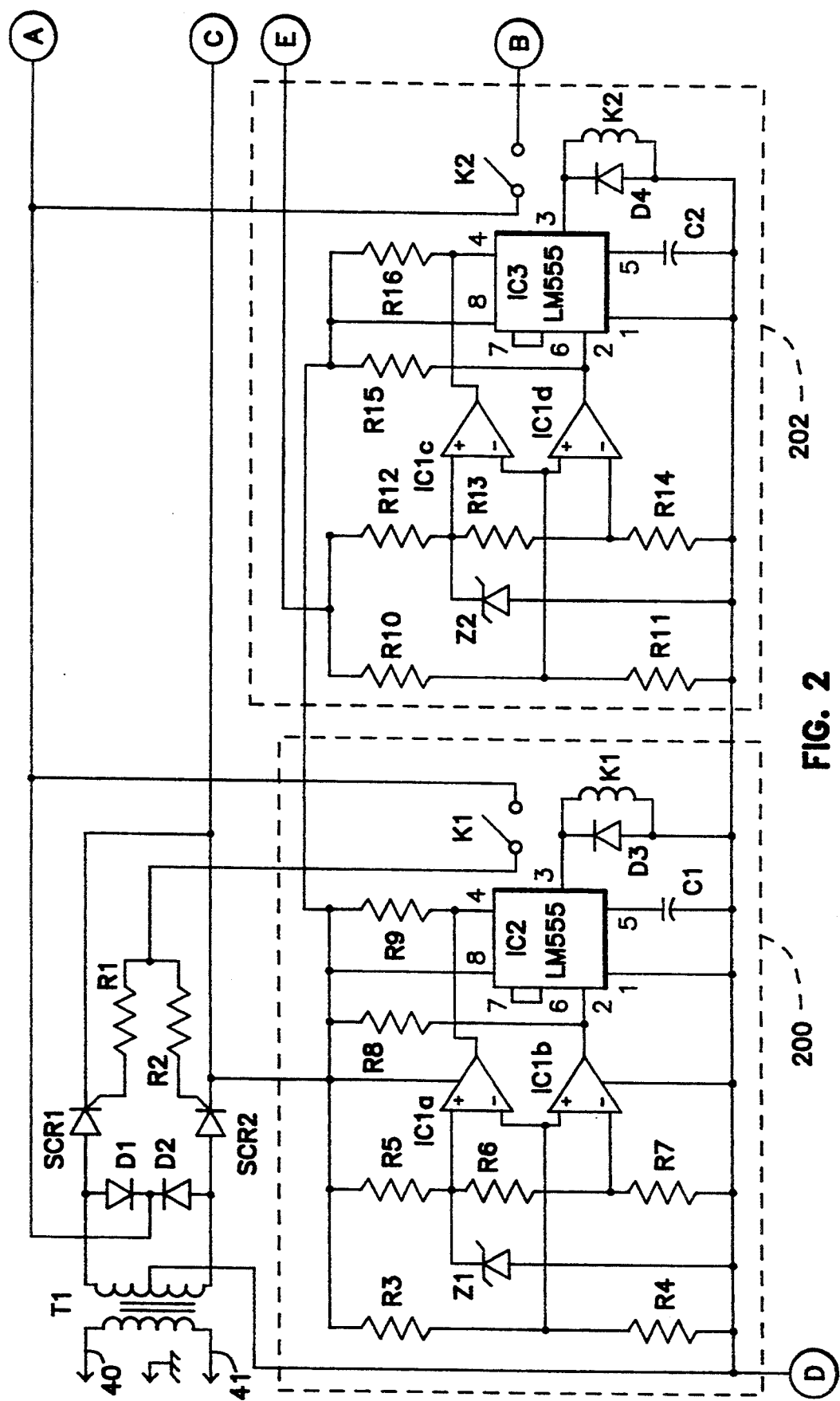

For purposes of illustration, the present invention, an electrical circuit forming a battery charge and discharge control system manager, will be described in the context of its use in conjunction with a conventional motor vehicle or boat electrical system, where the vehicle or boat has a main battery and two auxiliary batteries. FIGS. 1 and 2 are schematic illustrations of the present invention.

The conventional system, used on boats, includes a generator (not shown) or alternator (not shown) and regulator attached to the engine. A main battery would be connected directly to the generator or alternator (not shown). The present invention has a switching circuit as shown in FIG. 1. The switching circuit is connected to the boat main battery, and to a plurality of auxiliary batteries. In the embodiment shown in FIG. 1 there are two auxiliary batteries B1 and B2 which in the preferred use, are deep cycle marine batteries. The connections A, B, C, D and E of FIG. 1 are not required for the first preferred embodiment of the present invention but are used for the second preferred embodiment described in conjunction with FIG. 2.

As shown in FIG. 1, the ignition switch 10 when turned ON, provides switching current to energize relay coils K3, K4 and K5 through lines 2, 4, and 6. The magnetic field generated in relay coils K3, K4, and K5 causes the contacts of relay switches K3, K4 and K5 to close. The closed contacts of switches K3, K4 and K5 causes the main battery M1 and the auxiliary batteries B1 and B2 to be placed in parallel. Because the main battery M1 will allays charge when the engine is running, as a result of its direct connection to a generator or regulator attached to the engine, connecting batteries B1 and B2 in parallel with main battery M1 provides an effective method of charging all three batteries simultaneously.

More specifically, the relay coils K4 and K5 and their respective switches K4 and K5 provide a first switching means, wherein, after the ignition switch has been turned ON, magnetic fields are generated in relay coils K4 and K5 to close the contacts of relays K4 and K5 into first positions 22, 24, placing the auxiliary batteries B1 and B2 in parallel. When the ignition switch is turned OFF, magnetic fields are not generated in relay coils K4 and K5 and the contacts of relays K4 and K5 are open in second positions 28, 38. When the contacts of relays K4 and K5 are open, the auxiliary batteries B1 and B2 are connected in series.

Further, upon turning the ignition ON, relay coil K3 and its relay provide a second switching means, wherein, after the ignition has been turned ON a magnetic field is generated in relay coil K3 to close the contacts of relay K3 into a first position 20. When the ignition switch is turned OFF, a magnetic field is not generated in relay coil K3 and the contact of relay K3 is open in a second position 26. When the contacts of relay K3 are open, the main battery M1 is isolated from the auxiliary batteries B1 and B2. Isolation of the main battery M1 from B1 and B2 allows for the discharge of the auxiliary batteries B1 and B2 without the reduction of main battery M1 voltage potential. Through isolation, the main battery can maintain voltage potential and provide the power need for starting the engine.

Upon turning the ignition switch ON to start the engine, the first and second switching means are energized at approximately the same time, and the main battery is placed in parallel with the auxiliary batteries B1 and B2 for charging.

FIG. 2 describes an alternate preferred embodiment to the present invention in which a battery charging circuit which takes its power from AC mains 40, 41 is provided. DC charging current is provided by taking the AC mains power through step-down transformer T1 and rectifying the power to provide rectified DC current. A center tapped full wave rectifier 42 is used to provide the main charging current through SCR1 and SCR2. Additional DC current is provided through a center tap full wave rectifier by means of diodes D1 and D2 to provide switching current to control relay coils K3, K4 and K5.

FIG. 2 is connected to the circuit described above in the first preferred embodiment, as shown in FIG. 1 through connections A, B, C, D and E. In addition to the primary charging current being obtained from the charging circuits of the vehicle ignition system, the charging current in this alternate preferred embodiment is taken from a battery charger circuit powered from the AC mains 40. A unique feature of the charging circuit is the ability to charge the primary battery using charging parameters specific to lead acid batteries and the auxiliary batteries using charging parameters specific to deep cycle marine batteries. The charging circuits of FIG. 2 are designed to prevent overcharging of the respective batteries by removing the charging current when the batteries reach their optimal operating voltages. Since the main and auxiliary batteries have differing optimal operating voltages indicating a full charge, separate charging sense circuits are used to determine when a full charge is obtained on the main (lead acid) or auxiliary (deep cycle) batteries.

The electrical components within dashed portion 200 of FIG. 2 are the components of the battery charging circuit for the deep cycle auxiliary batteries. The portion of the circuitry of FIG. 2 inside dashed box 202 comprise the charging circuit for the main (lead acid) battery.

Referring first to the circuitry 200 of the battery charging circuit for the auxiliary batteries, the main operational details will first be described. Deep cycle batteries have an optimal charging voltage of approximately 14 volts. Once fully charged, a battery will typically discharge a moderate amount based on internal resistance, leakage current and the like. The circuitry 200 of the charging circuit of FIG. 2 for the auxiliary batteries is designed to sense when the auxiliary batteries are fully charged and then to interrupt the charging current. In order that the charging circuit 200 of FIG. 2 does not reapply the charging current too soon or too often (typically in an oscillation mode) a hysteresis or window of voltage ranges is used to ensure that the battery charging circuit 200 does not provide additional charging current of the auxiliary batteries unless the voltage drops below 12.75 volts. Thus the charging circuit 200 of FIG. 2 has an upper threshold for interrupting the charging current of 14.25 volts and it will not reapply the charging current unless the voltage of the auxiliary batteries drops below 12.75 volts.

As a detailed discussion of the operation of charging circuit 200, relay K1 is used to control the triggers of SCR1 and SCR2 to interrupt the main charging current for all batteries. Since the fully charged voltage of the main (lead acid) battery is lower than the fully charged voltage of the auxiliary (deep cycle) batteries, interrupting the main charging voltage through SCR1 and SCR2 when the optimal charging voltage of the auxiliary (deep cycle) batteries is achieved will only occur after the main battery (lead acid) has been fully charged.

Relay coil K1 is primarily controlled by IC2 which in the preferred embodiment is part no. LM555 available from National Semiconductor and other vendors. IC2 is an off-the-shelf standard 555 timer well known to those skilled in art. It is wired according to manufacturers specifications in FIG. 2 to operate in bistable mode. Those skilled in the art will readily recognize that a wide variety of control circuitry for relay K1 could be substituted for the circuitry described above.

IC2 operating in bistable mode is controlled by comparators IC1a and IC1b which are, in the preferred embodiment, part number LM339 available from National Semiconductor and other vendors. The comparators sense the voltage on the auxiliary batteries and operate to remove the charging current when the upper cutoff voltage is reached by the batteries. The comparators will then not reapply the charging current to the auxiliary batteries unless and until the voltage drops below 12.75 volts.

Comparator IC1a compares a reference voltage on the noninverting input to the sensed voltage on the auxiliary batteries when in charging mode. In charging mode, as described above, the batteries are all placed in parallel for charging.

Comparator IC1a compares a reference voltage to the voltage on the output of the center-tapped, full-wave rectifier which is directly connected to the positive terminals of the main and auxiliary batteries configured in parallel. The reference voltage is determined by Zener Diode Z1 and the voltage ladder across resisters R5, R6 and R7. The reference voltage applied to IC1a on the noninverting input is compared to the voltage on the output of the center tapped full wave rectifier of FIG. 2 through another voltage ladder R3, R4, which is directly connected to the positive terminals of the batteries when configured in parallel for charging. Thus the comparator IC1a will sense the upper threshold of charge voltage and interrupt the charging current when that threshold is reached.

In order that oscillation does not occur, the charging circuits have a "turn on" voltage which is substantially less than the "turn off" voltage. In implementation of this concept, comparator IC1b compares a reference voltage determined from resistance ladder R5, R6 and R7 applied to the noninverting input of comparator IC1b to the voltage on the auxiliary batteries through resistance ladder R3, R4. Since the same resistance ladder R5, R6, R7 is used to determine the threshold voltages for both IC1a and IC1b, the reference voltage drift will track with both comparators resulting in no common mode error drift due to temperature variation.

Thus the cutoff voltage for comparator IC1b in the preferred embodiment of the present invention is 12.75 volts. In this fashion IC2 operating as a bistable latch, will close the relay contacts for relay K1 upon comparator IC1b sensing that the voltage across the auxiliary batteries configured for charging is less than 12.75 volts. Once the voltage across the parallel configured batteries exceeds 14.25 volts, comparator IC1a will sense the voltage threshold and cause bistable circuit IC2 to open relay K1 to interrupt the charging current.

The charging current control circuit for the main battery is shown in dashed portion 202 of FIG. 2. The circuit configuration for controlling the main battery 202 is similar to the configuration of the circuitry for the auxiliary charging circuit 200.

Comparator IC1c and IC1d receive reference voltages from a resistance ladder comprising resistors R12, R13 and R14. Comparators IC1c and IC1d take different reference voltages off different points along the voltage ladder circuit. IC3 is also an LM555 timer operating in the bistable mode for controlling relay K2. Relay K2 controls the main battery charging current for the battery circuitry in the lower half of FIG. 2. Relay K2 includes a diode D4 which is a back EMF diode, to protect IC3 when relay coil K2 is opened. The resistive ladder comprising resistors R12, R13 and R14 have a fixed voltage reference applied to it through Zener Diode Z2.

Comparator IC1c senses the voltage threshold of 13.5 volts on the main battery and interrupts the charging current to prevent the overcharging or boiling of the main (lead acid) battery. IC1c is used to cause bistable latch IC3 to apply current to the charging circuits in the lower half of FIG. 2 connected through A, B, C, D and E. Comparator IC1d compares the voltage set at a different point along voltage ladder R12, R13 and R14 for the chosen threshold voltage at 12.6 volts on the main battery.

IC1d is the lower threshold for the operating window of the circuit 202, of FIG. 2, for charging the main battery in parallel with the auxiliary batteries. Comparator IC1d serves to change the state of bistable timer circuit IC3 to close relay K2 to apply the charging current when main battery voltage drops below 12.6 volts. Thus the circuits 200, 202 of FIG. 2 show an automatic means for charging both deep discharge auxiliary batteries and main lead acid batteries of a boat or the like.

In operation of FIGS. 1 and 2 together, circuit IC3 is used to control relay K2 to apply or interrupt charging current for the main battery. Relay contact K2 serves as a master to control the closing of relay K3 through the relay coil K3, shown in FIG. 1. The energization of relay coil K3 causes the relay contact K3 to apply the charging current to the main batteries and auxiliary batteries configured in parallel for charging. Relay contact K2 will open when circuit 202 senses the voltage on the main battery at 13.5 volts. The opening of relay contact K2 will in turn open relay contact K3 removing the main charging current from the main battery only. As shown in FIG. 2, the opening of relay contact K2 will not interrupt the charging current applied to the auxiliary batteries. As described above, the charging current for the auxiliary batteries is controlled by circuit 200 which is configured to have a higher cutoff voltage than that of circuit 202.

Charging current remains on the auxiliary batteries when the voltage on the auxiliary batteries is between 13.5 volts (the cutoff voltage for the main battery) and 14.25 (the cutoff voltage of the auxiliary deep discharge batteries) in a preferred embodiment. During charging of the auxiliary batteries, relay contact K4 and K5 are in a normally open position due to the energization of relay coils K4 and K5. These relay coils are energized automatically by applying main voltage to the AC input to transformer T1. The energization of coils K4 and K5 cause the auxiliary batteries B1 and B2 to be configured in a parallel configuration for charging. When the AC mains are removed from transformer T1, relay contacts K4 and K5 move to the normally closed position due to the de-energization of relay coils K4 and K5. In this relaxed position, the batteries are automatically configured into a series connection resulting in an overall voltage of 24 volts, which is the preferred voltage for a trolling motor or the like. Those skilled in the art readily recognize that the batteries need not be placed in a series configuration if a trolling motor or the like requires 12 volts AC output.

Parts List

| COMPONENT NAME | REF DESIGNATOR | VALUE | ATTRIBUTES |
|---|---|---|---|
| Capacitor, Disc | C1 | .1 ufd/35 v | |
| Capacitor, Disc | C2 | .1 ufd/35 v | |
| COMPARATOR | IC1a | ¼ LM339 | |
| COMPARATOR | IC1b | ¼ LM339 | |
| COMPARATOR | IC1c | ¼ LM339 | |
| COMPARATOR | IC1d | ¼ LM339 | |
| Diode | D2 | 1N4001 | |
| Diode | D1 | 1N4001 | |
| Diode | D3 | 1N4001 | |
| Diode | D4 | 1N4001 | |
| Diode | D5 | 1N4001 | |
| Diode | D7 | 1N4001 | |
| Diode | D6 | 1N4001 | |
| Diode, Zener | Z1 | 5.1 V/500 MW | 1N751A or 1N4689 |
| Diode, Zener | Z2 | 5.1 V/500 MW | 1N751A or 1N4689 |
| NEG. | BM | #12 AWG/ZIP | |
| NEG. | B1 | #12 AWG/ZIP | |
| NEG. | B2 | #12 AWG/ZIP | |
| NEG. | 12 V. OUTPUT | 5/16" STUD | |
| NEG. | 24 V. OUTPUT | 5/16" STUD | |
| POS. | BM | #12 AWG/ZIP | |
| POS. | B1 | #12 AWG/ZIP | |
| POS. | B2 | #12 AWG/ZIP | |
| POS. | 12 V. OUTPUT | ⅜" STUD | |
| POS. | 24 V. OUTPUT | ⅜" STUD | |
| POWER CORD | PC1 | 3 COND. #14 AWG | |
| RELAY | K3 | 12 V/30 A | |
| RELAY | K4 | 12 V/30 A | |
| RELAY | K5 | 12 V/30 A | |
| RELAY, REED | K1 | 12 V/.75 A | |
| RELAY, REED | K2 | 12 V/.75 A | |
| Resistor | R1 | 33 ohm/¼ w | |
| Resistor | R2 | 33 ohm/¼ w | |
| Resistor | R5 | 1.8 K/¼ W | |
| Resistor | R7 | 43 K/¼ W/5% | |
| Resistor | R6 | 5.1 K/¼ W/5% | |
| Resistor | R9 | 10 K/¼ W | |
| Resistor | R8 | 10 K/¼ W | |
| Resistor | R12 | 1.8 K/¼ W | |
| Resistor | R14 | 43 K/¼ W/5% | |
| Resistor | R13 | 3.6 K/¼ W/5% | |
| Resistor | R16 | 10 K/¼ W | |
| Resistor | R15 | 10 K/¼ W | |
| Resistor | R3 | 33 K/¼ W/5% | |
| Resistor | R4 | 18 K/¼ W/5% | |
| Resistor | R10 | 33 K/¼ W/5% | |
| Resistor | R11 | 20 K/¼ W/5% | |
| SCR | SCR1 | MCR225 | |
| SCR | SCR2 | MCR225 | |
| TIMER | IC2 | LM555 | |

What is claimed:

1. A battery charge and discharge control system for vehicles having an engine with a charging system connected to a main battery, an ignition switch controlling the engine, a first auxiliary battery, and a second auxiliary battery comprising:
   a. a first switching means having a first position for placing the first auxiliary battery in parallel with the second auxiliary battery, and having a second position for placing the first auxiliary battery in series with the second auxiliary battery;
   b. a second switching means having a first position when said first switching means is in said first position, for placing the main battery in parallel with the first auxiliary battery and the second auxiliary battery, such that the first auxiliary battery and the second auxiliary battery may be charged from the charging system, and having a second position for isolating the main battery from the first auxiliary battery and the second auxiliary battery such that the auxiliary batteries may be discharged independent of the main battery; and
   c. means for automatically placing said first switching means and said second switching means in said first positions when the ignition switch is turned on.

2. The battery charge and discharge control system of claim 1, wherein the main battery and the auxiliary batteries have different maximum charge potentials.

3. The battery charge and discharge control system of claim 1, including a charger circuit and an override switch, wherein said override switch causes said first switching means to be placed in said first position when the ignition switch is turned off, allowing said charger circuit to charge the main battery and the auxiliary batteries in parallel,
   said charger circuit having a means for sensing a main battery charge potential and discontinuing charge of the main battery upon sensing a main battery maximum charging potential,
   said charger circuit having a means for sensing an auxiliary battery charge potential and discontinuing charge of the auxiliary batteries upon sensing an auxiliary battery maximum charging potential.

4. A battery charge and discharge control system for vehicles having an engine with a charging system connected to a main battery, an ignition switch controlling the engine, a first auxiliary battery, and a second auxiliary battery comprising:
   a. a first switching means having a first position when activated by a first relay, for connecting in parallel the first auxiliary battery and the second auxiliary battery, and having a second position when deactivated by said first relay for connecting in series the first auxiliary battery and the second auxiliary battery;

b. a second switching means activated by a second relay, having a first position when said first switching means is in said first position, for connecting the main battery in parallel with the first auxiliary battery and the second auxiliary battery, such that the first auxiliary battery and the second auxiliary battery may be charged from the charging system, and having a second position for isolating the main battery from the first auxiliary battery and the second auxiliary battery such that the auxiliary batteries may be discharged independent of the main battery;

c. means responsive to the ignition switch for automatically placing said first switching means and said second switching means in said first positions when the ignition switch is turned on, wherein turning the ignition switch on energizes said first relay and said second relay;

d. means responsive to an override switch for placing said first switching means and said second switching means in said first positions when the ignition switch is turned off, for charging the main battery, the first auxiliary battery and the second auxiliary battery; and e. charger circuit means for charging the main battery, the first auxiliary battery, and the second auxiliary battery when the ignition switch it turned off, said charger circuit including a first sensing circuit and a second sensing circuit, said first sensing circuit, senses first auxiliary battery and second auxiliary battery charge potential and discontinues charging of the auxiliary batteries upon sensing an auxiliary battery maximum charging potential, and places said first switching means in said second position, to yield a series connection between the first and second auxiliary batteries;

said second sensing circuit, senses main battery charge potential and discontinues charging of the main battery upon sensing a main battery maximum charging potential and causes said second switching means to be placed in said second position to isolate the main battery from the first and second auxiliary batteries.

5. The battery charge and discharge control system of claim 4, wherein the main battery and the first and second auxiliary batteries have different maximum charge potentials.

6. The battery charge and discharge control system of claim 4, wherein said first sensing circuit has an auxiliary charging window, wherein said auxiliary charging window defines an auxiliary voltage range at which said first sensing circuit will prohibit additional charging of the first and second auxiliary batteries, said first sensing circuit allowing the first and second auxiliary batteries to be charged when first and second auxiliary battery voltages drop below said first charging window.

7. The battery charge and discharge control system of claim 4, wherein said second sensing circuit has a main charging window, wherein said main charging window defines a main voltage range at which said second sensing circuit will prohibit additional charging of the main battery, said second sensing circuit allowing the main battery to be charged when main battery voltage drops below said main charging window.

8. A battery charge and discharge control system for vehicles having an engine with a charging system connected to a main battery, a first auxiliary battery, and a second auxiliary battery comprising:

a. a first switch and a second switch, each having a first position for placing the first auxiliary battery in parallel with the second auxiliary battery, and each switch having a second position for placing the first auxiliary battery in series with the second auxiliary battery;

b. a third switch, electrically connected to the main battery, having a first position when said first and second switches are in said first positions, for placing the main battery in parallel with the first auxiliary battery and the second auxiliary battery, such that the first auxiliary battery and the second auxiliary battery may be charged from the charging system, and having a second position for isolating the main battery from the first auxiliary battery and the second auxiliary battery such that the auxiliary batteries may be discharged independent of the main battery; and c. an ignition switch electrically connected to said first, second and third switches for automatically placing said first, second and third switches in said first positions when said ignition switch is turned on.

9. The battery charge and discharge control system of claim 8, wherein the main battery and the auxiliary batteries have different maximum charge potentials.

10. The battery charge and discharge control system of claim 8, including a charger circuit, electrically connected to the main and auxiliary batteries and an override switch electrically connected to said first, second and third switches, wherein said override switch causes said first, second and third switches to be placed in said first positions when the ignition switch is turned off, allowing said charger circuit to charge the main battery and the auxiliary batteries in parallel, said charger circuit having a sensing circuit for sensing a main battery charge potential and discontinuing charge of the main battery upon sensing a main battery maximum charging potential, said charger circuit having a sensing circuit for sensing an auxiliary battery charge potential and discontinuing charge of the auxiliary batteries upon sensing an auxiliary battery maximum charging potential.

11. A battery charge and discharge control system for vehicles having an engine with a charging system connected to a main battery, a first auxiliary battery, and a second auxiliary battery comprising:

a. a first switch and a second switch each having a first position when activated, for connecting in parallel the first auxiliary battery and the second auxiliary battery, and each switch having a second position when de-activated for connecting in series the first auxiliary battery and the second auxiliary battery;

b. a third switch having a first position when said first and second switches are in said first positions, for connecting the main battery in parallel with the first auxiliary battery and the second auxiliary battery, such that the first auxiliary battery and the second auxiliary battery may be charged from the charging system, and having a second position for isolating the main battery from the first auxiliary battery and the second auxiliary battery such that the auxiliary batteries may be discharged independent of the main battery;

c. an ignition switch electrically connected to said first, second and third switches for automatically placing said first, second and third switches in said first positions when the ignition switch is turned on, wherein turning said ignition switch on energizes relay coils operatively associated with said first, second and third switches;

d. an override switch electrically connected to said first, second an third switches for placing said first, second and third switches in said first positions when the ignition switch is turned off, for charging the main battery, the first auxiliary battery and the second auxiliary battery; and e. a charger circuit electrically connected to the main battery, the first auxiliary battery, and the second auxiliary battery for charging the main battery, the first auxiliary battery, and the second auxiliary battery when the ignition switch it turned off, said charger circuit including a sensing circuit, said sensing circuit, senses the main battery charge potential and discontinues charging of the main battery upon sensing a main battery maximum charging potential and causes said third switch to be placed in said second position to isolate the main battery from the first and second auxiliary batteries;

said sensing circuit, senses the first auxiliary battery and second auxiliary battery charge potential and discontinues charging of the auxiliary batteries upon sensing an auxiliary battery maximum charging potential, and places said first and second switches in said second positions, to yield said series connection between the first and second auxiliary batteries.

12. The battery charge and discharge control system of claim 11, wherein the main battery and the first and second auxiliary batteries have different maximum charge potentials.

13. The battery charge and discharge control system of claim 11, wherein said sensing circuit has a first charging window, wherein said first charging window has upper and lower voltages that define a first voltage range at which said sensing circuit will prohibit additional charging of the first and second auxiliary batteries, said sensing circuit allowing the first and second auxiliary batteries to be charged when first and second auxiliary battery voltages drop below said first charging window, said sensing circuit having a second charging window, wherein said second charging window has upper and lower voltages that define a second voltage range at which said sensing circuit will prohibit additional charging of the main battery.

14. The battery charge and discharge control system of claim 13, wherein said sensing circuit allows the main battery to be charged when main battery voltage drops below said second charging window.

15. The battery charge and discharge control system of claim 13 wherein said sensing circuit includes a first sensing circuit for sensing said auxiliary battery charge potential and a second sensing circuit for sensing said main battery charge potential.

16. The battery charge and discharge control system of claim 13 wherein said first voltage window and said second voltage window have upper and lower voltages that are not equivalent.

17. The battery charge and discharge control system of claim 13 wherein said first and second voltage window lower voltages are equivalent.

18. The battery charge and discharge control system of claim 13 wherein said first and second voltage window upper voltages are equivalent.

* * * * *